US012669149B2

(12) United States Patent
Rabourdin et al.

(10) Patent No.: US 12,669,149 B2
(45) Date of Patent: Jun. 30, 2026

(54) UPPER BEARING CAP FOR A SUSPENSION THRUST BEARING DEVICE

(71) Applicant: AKTIEBOLAGET SKF, Gothenburg (SE)

(72) Inventors: Paul Rabourdin, Chambray lès Tours (FR); Romain Medarian, Tours (FR); Thomas Lepine, Tours (FR); Julien Maffucci, Ballan-miré (FR)

(73) Assignee: AKTIEBOLAGET SKF, Gothenburg (SE)

( * ) Notice: Subject to any disclaimer, the term of this patent is extended or adjusted under 35 U.S.C. 154(b) by 80 days.

(21) Appl. No.: 18/904,479

(22) Filed: Oct. 2, 2024

(65) Prior Publication Data

US 2025/0116296 A1    Apr. 10, 2025

(30) Foreign Application Priority Data

Oct. 9, 2023    (DE) .......................... 102023209807.5

(51) Int. Cl.
　　*F16C 35/067*　　　(2006.01)
　　*F16C 19/16*　　　(2006.01)
(52) U.S. Cl.
　　CPC .......... *F16C 35/067* (2013.01); *F16C 19/163* (2013.01); *B60G 2204/418* (2013.01); *F16C 2326/05* (2013.01)

(58) Field of Classification Search
　　CPC ...... F16C 19/10; F16C 19/163; F16C 35/067; F16C 2326/05; B60G 2204/418
　　See application file for complete search history.

(56) References Cited

U.S. PATENT DOCUMENTS 10,428,869 B2 *　10/2019　Gaultier .............. F16C 33/3887

FOREIGN PATENT DOCUMENTS

WO　　WO-2011076622 A1 *　6/2011　.............. F16C 19/10

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

An upper bearing cap for a suspension thrust bearing device includes a radial wall having an upper surface configured to face a retainer seat and an opposite lower surface configured to contact a rolling-element bearing, an axial outer annular skirt extending axially downwards from a radial outer edge of the radial wall and having an axial outer surface and an opposite axially inner surface, and at least one hook section comprising at least one hook configured to interact with a further component of the suspension thrust bearing device. A radially outer portion of the radial wall has a first thickness, and the axial outer annular skirt has a second thickness, and at least a portion of the at least one hook section has a third thickness greater than the first thickness and greater than the second thickness.

11 Claims, 3 Drawing Sheets

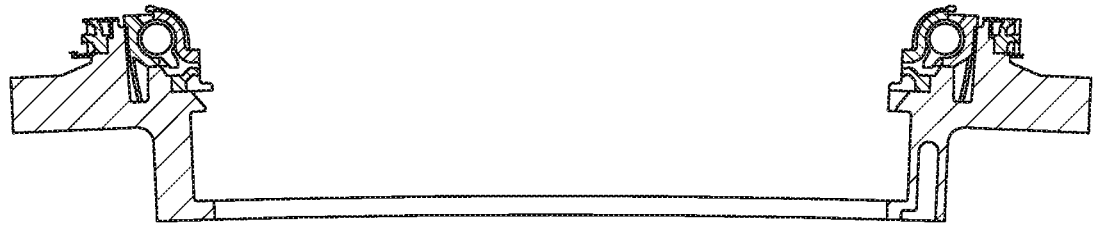
FIG.7
NEW

UPPER BEARING CAP FOR A SUSPENSION THRUST BEARING DEVICE

CROSS-REFERENCE

This application claims priority to German patent application no. 10 2023 209 807.5 filed on Oct. 9, 2023, the contents of which are fully incorporated herein by reference.

TECHNOLOGICAL FIELD

The present disclosure is directed to an upper bearing cap for a suspension thrust bearing device.

BACKGROUND

A suspension thrust bearing device is generally provided with a rolling-element bearing comprising an upper ring and a lower ring between which are positioned rolling elements, for example balls or rollers, and with lower and upper caps. The lower and upper caps form housings for the rings of the rolling-element bearing and provide the interface between the rings and the neighboring elements.

The suspension thrust bearing device is arranged in the top part of the suspension strut between the vehicle body and a suspension spring. The suspension spring is mounted around a damping piston rod, the end of which is connected to the vehicle body. The suspension spring bears axially, directly or indirectly, on the lower cap of the thrust bearing device.

The suspension thrust bearing device allows transmission of axial and radial forces between the suspension spring and the vehicle body while allowing a relative rotational movement between the lower cap and the upper cap resulting from a deflection of the steered wheels of the vehicle and/or compression of the suspension spring.

Due to the forces acting on the suspension thrust bearing device, it is necessary that the caps, particularly the upper bearing cap, is rather robust. In order to increase the robustness of the caps, it is necessary, since the caps are usually made by a molding process from a plastic material, to increase the amount of material used for molding the caps. This leads to both an increase in weight and costs for each of the caps.

SUMMARY

It is therefore an aspect of the present disclosure to provide a cost-efficient upper bearing cap for a suspension thrust bearing device that has an improved robustness.

In the following an upper bearing cap for a suspension thrust bearing device is provided. The upper bearing cap comprises a radial portion having an upper surface configured to face a retainer seat and an opposite lower surface configured to be in contact with a rolling-element bearing and an axial outer annular skirt extending axially downwards from an outside edge of the radial portion and having an outer surface and an opposite inner surface.

A wall of the radial portion has a first thickness at an axial outside of the radial portion, and the axial outer annular skirt has a wall having a second thickness. The axial outer annular skirt may be configured to at least partially surround a lower support cap of the suspension thrust bearing.

In order to provide a cost-efficient upper bearing cap that has an improved robustness, the upper bearing cap comprises in the circumferential direction at least one hook section comprising at least one hook configured to interact with a further component of the suspension thrust bearing device, wherein the at least one hook section comprises at least one wall having a thickness which is larger than the first thickness and/or the second thickness.

Since the at least one wall of the at least one hook section has a larger thickness than the radial portion and/or the outer skirt, the robustness of the upper bearing cap may be increased. Thus, it is also possible to reduce the thickness of the at least one wall of the upper bearing cap without reducing the robustness of the upper bearing cap such that the amount of material needed for the upper bearing cap may be reduced which consequently may reduce the costs for the upper bearing cap.

Moreover, the radial portion of the upper bearing cap may have a stepped shape, wherein the outside portion of the radial portion may have a smaller thickness than the inside portion of the radial portion. The thickness of the outside portion of the radial portion may be equal to the thickness of the outer skirt wall.

Preferably, the upper bearing cap may comprise a plurality of hook sections that are circumferentially distributed around the upper bearing cap. The plurality of hooks may be arranged on the outer skirt and adapted to interfere (interact) with a lower cap of the bearing device. The hooks may form retaining means provided to axially retain the upper and lower caps relative to one another.

According to a further embodiment, the at least one hook section has a radial wall extending at least partially along the radial portion and an axial wall extending at least partially along the outer skirt, wherein a thickness of the radial wall and/or a thickness of the axial wall is larger than the first thickness and/or the second thickness. For example, the thickness of radial wall may be equal to the thickness of the axial wall. Alternatively, the thickness of the radial wall may be different from the thickness of the axial wall.

By increasing the wall thickness of the upper bearing cap in the region of the at least one hook section, by providing the at least one hook section with a thicker radial and/or axial wall, the robustness of the upper bearing cap can be increased. Alternatively or additionally, this may allow a reduction of the thickness of the remaining upper bearing cap walls, which may allow a reduction in the amount of material needed for the upper bearing cap.

Preferably, the upper bearing cap further comprises in the circumferential direction at least one reinforcement section, wherein the at least one reinforcement section has at least one wall having a thickness which is larger than the first thickness and/or the second thickness. Additionally, the at least one reinforcement section may be provided with at least one reinforcement rib. Adding at least one reinforcement section may increase the robustness of the upper bearing cap.

The thickness of the wall of the at least one reinforcement section may be equal or larger than the thickness of the radial wall and/or the axial wall of the at least one hook section. For example, the at least one reinforcement section may comprise a radial reinforcement wall extending at least partially along the radial portion and/or an axial reinforcement wall extending at least partially along the outer skirt.

Preferably, a thickness of the radial reinforcement wall may be equal to a thickness of the axial reinforcement wall. Alternatively, a thickness of the radial reinforcement wall may be different than a thickness of the axial reinforcement wall.

According to a further embodiment, the upper bearing cap comprises a plurality of reinforcement sections that are circumferentially distributed around the upper bearing cap.

Preferably, the at least one reinforcement section and the at least one hook section are alternatingly arranged in the circumferential direction.

For example, the at least one reinforcement section may be circumferentially arranged between two hook sections. This allows the robustness of the upper bearing cap to be further increased such that the amount of material need for the upper bearing cap may be reduced which allows a reduction in the weight of the upper bearing cap and/or the costs for the upper bearing cap. Moreover, the at least one hook section and the at least one reinforcement section may be alternately arranged.

Moreover, an extension in the circumferential direction of the at least one hook section may be equal to an extension in the circumferential direction of the at least one reinforcement section. Alternatively, the extension in the circumferential direction of the at least one hook section may be different from the extension in the circumferential direction of the at least one reinforcement section. For example, the extension in the circumferential direction of the at least one hook section and/or reinforcement section may depend on the thickness of the respective section.

According to a further aspect, a suspension thrust bearing device is provided, comprising a lower support cap, an upper bearing cap as described above, and at least one bearing arranged between the caps.

Further preferred embodiments are described and shown in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described with reference to the drawings, wherein the drawings are exemplarily only, and are not intended to limit the scope of protection. The scope of protection is defined by the accompanied claims, only.

FIG. 7 is a side elevational view of a bearing and a lower support cap for forming a suspension thrust bearing with the upper bearing cap of FIG. 1.

DETAILED DESCRIPTION

Figure 1:
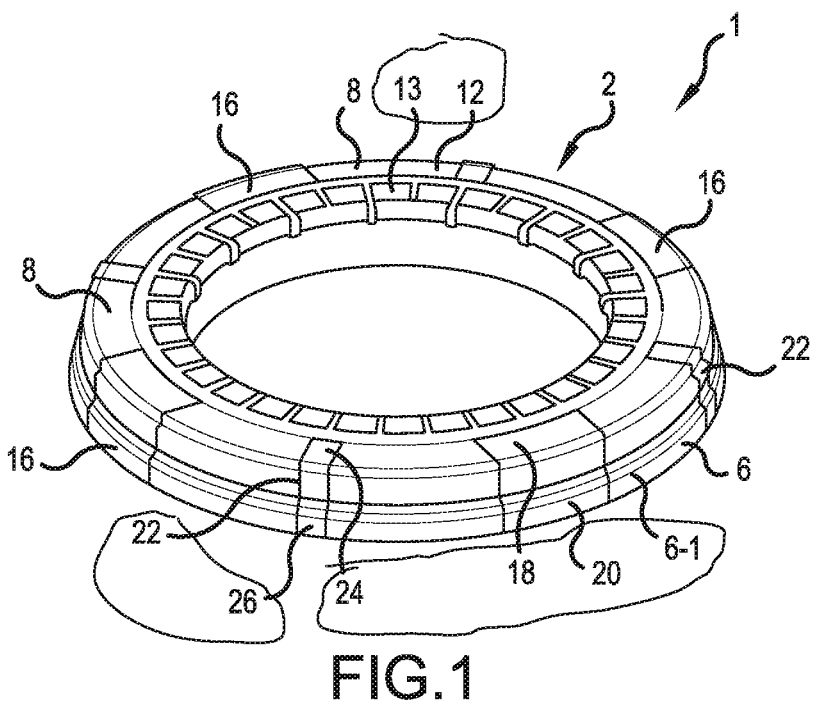
FIG. 1 is a perspective view of an upper side of an upper bearing cap according to an embodiment of the present disclosure.
Figure 2:
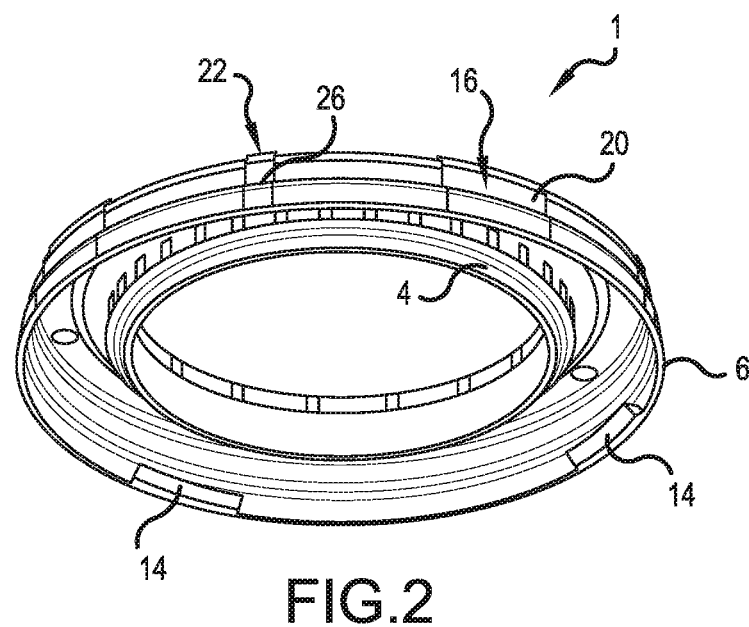
FIG. 2 is a perspective view of a lower side of the upper bearing cap of FIG. 1.

In the following same or similar functioning elements are indicated with the same reference numerals.

An upper bearing cap 1 for a suspension thrust bearing device is described with reference to FIGS. 1-6. The suspension thrust bearing device is configured to be installed between a top retainer seat suitable of resting, directly or indirectly, in an element of a chassis of a motor vehicle and a suspension spring.

The suspension thrust bearing device 1 comprises the upper bearing cap 1, a lower support cap 30 (FIG. 7), and a rolling-element bearing 32 axially interposable between the caps. The caps may be mounted in direct contact with the rolling-element bearing without the interposition of an intermediate element or in indirect contact with the rolling-element bearing with the interposition of an intermediate element.

The upper bearing cap 1 may be made in one part, for example from plastic material, such as polyamide PA 6.6 which may or may not be reinforced with fibers, for example glass fibers.

The upper bearing cap 1 comprises a radial wall 2, an axial inner annular skirt 4, and an axial outer annular skirt 6 radially surrounding the inner skirt 4. The radial portion 2 has an upper surface 8 intended to face the top retainer seat and an opposite lower surface 10 that has a region 11 that is configured to contact the rolling-element bearing 32.

In the illustrated example, the radial portion 2 has a stepped shape having a radial inside portion 13 and a radial outside portion 12. The bearing region 11 is located at the lower surface of the inside portion 13. At the radial outside portion 12, a thickness of a wall of the radial portion 2 is defined by the upper surface 8 and the opposite lower surface 10, and the radial outside portion 12 has a smaller axial thickness than the radial inside portion 13 of the radial portion 2.

The outer skirt 6 radially surrounds the lower support cap 30. The inner and outer skirts 4, 6 extend axially downwards from the outside portion 12 of the radial portion 2, and the outer skirt 6 has a radially outer surface 5 and an opposite radially inner surface 7. In the illustrated example, the outer skirt 6 extends from a large-diameter edge of the radial portion 2. The inner skirt 4 extends from a small-diameter edge of the radial portion 2. The outer and inner surfaces 5, 7 define the radial thickness d2 of the outer skirt 6.

Figure 8:
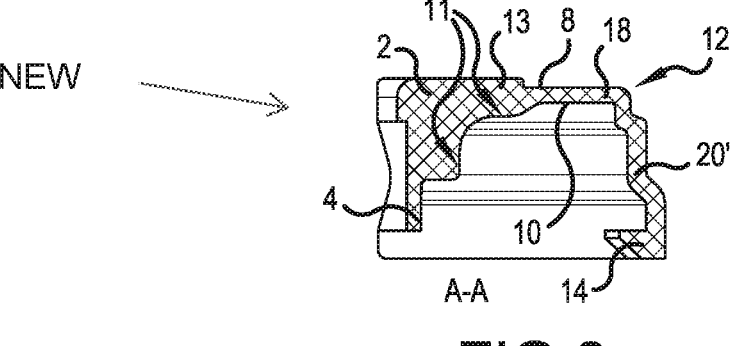
FIG. 8 is a cross section of a modified version of the bearing cap of FIG. 1 in the same location as line A-A in FIG. 3.

The upper bearing cap 1 further includes a plurality of circumferentially distributed hook sections 16. Each hook section 16 comprises at least one hook 14 configured to interact with a further component of the suspension thrust bearing device such as the lower cap 30. Each of the hook sections 16 comprises a radial wall portion 18 (a first portion of the radial outside portion 12) extending at least partially along the radial wall 2 and an axial wall portion 20 (a first portion of the outer skirt 6) extending at least partially along the axial outer annular skirt 6. A second portion 12-1 of the radial outside portion 12 adjacent to the first portion 18 of the radial outside portion 18 has a first thickness d1, and a second portion 6-1 of the axial wall portion 6 adjacent to the first portion of the outer skirt 20 has a second thickness d2. A thickness of the radial wall portion 18 may be referred to as a third thickness and a thickness of the axial wall portion 20 may be referred to as a fourth thickness. The third thickness and the fourth thickness may be the same (see FIG. 4) or different (See FIG. 8).

Figures 3, 4, 5, 6:
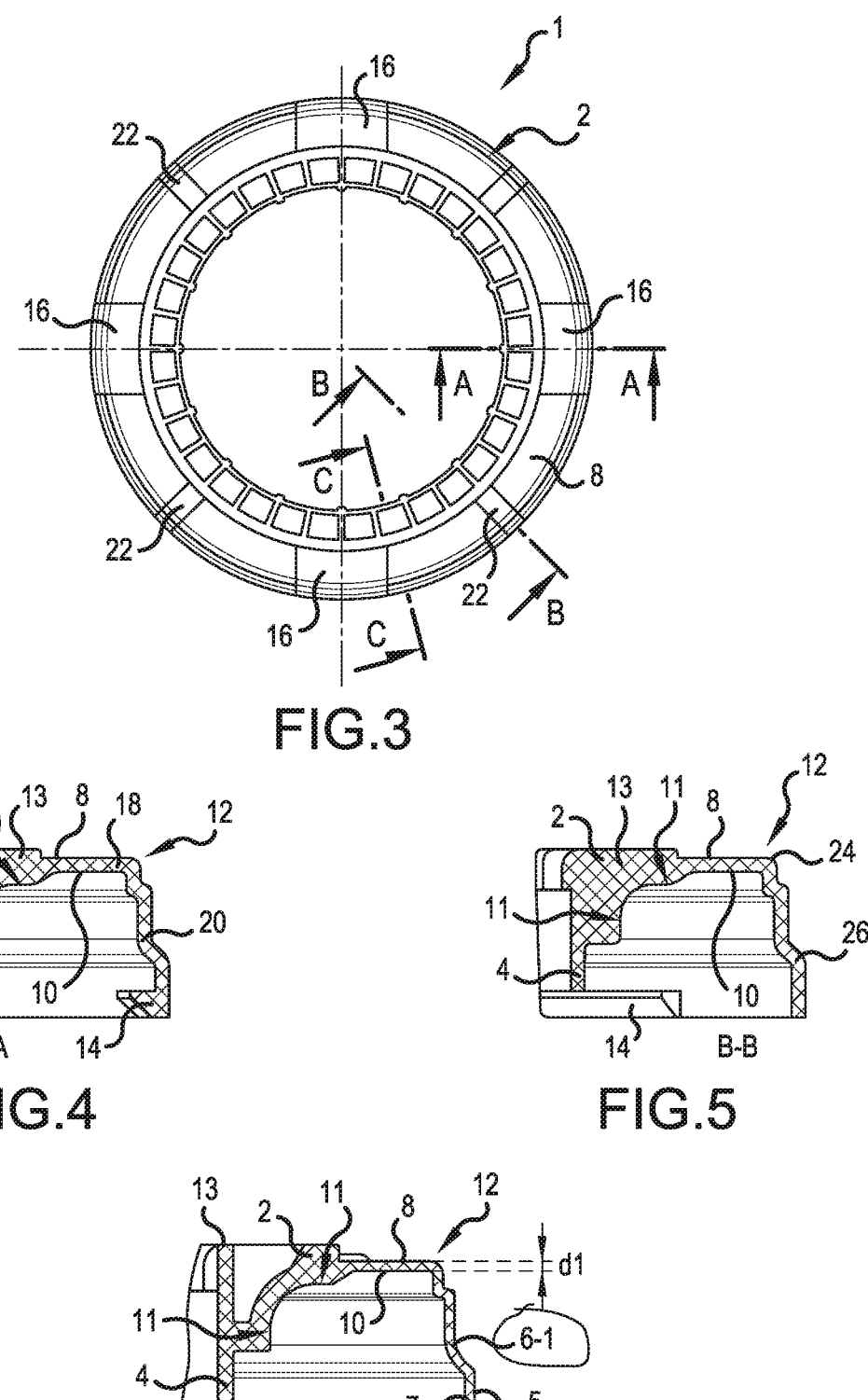
FIG. 3 is a top view of the upper bearing cap of FIG. 1.
FIG. 4 is a cross section of the upper bearing cap along the line A-A in FIG. 3.
FIG. 5 is a cross section of the upper bearing cap along the line B-B in FIG. 3.
FIG. 6 is a cross section of the upper bearing cap along the line C-C in FIG. 3.

As can be seen by comparing FIGS. 4 and 6, a thickness of the first portion 18 of the radial outside portion 12 is larger than the first thickness d1 and a thickness of the first portion 20 of the outer skirt 6 is greater than the second thickness d2. As can be seen from FIG. 4, the thickness of the first portion 18 of the radial outside portion is equal to the thickness of the first portion 20 of the outer skirt 6. Alternatively, the thickness of the first portion 18 of the radial outside portion 12 may differ from the thickness of the first portion 20 of the outer skirt 6.

Furthermore, the upper bearing cap 1 comprises in the circumferential direction a plurality of reinforcement sections 22. As can be seen from FIG. 5, each reinforcement section 22 has a radial reinforcement wall portion 24 (a third portion of the radial outer portion 12) extending at least partially along the radial wall 2 and an axial reinforcement wall portion 26 (a third portion of the outer skirt 6) extending at least partially along the axial outer annular skirt 6. Preferably, a thickness of the radial reinforcement wall portion 24 (a fifth thickness) is equal to a thickness of the axial reinforcement wall portion 26 (a sixth thickness) as can be seen in FIG. 5. Alternatively, a thickness of the radial reinforcement wall portion 24 may be different to a thickness of the axial reinforcement wall portion 26.

As can be seen from the figures, the both the reinforcement sections 22 and the hook sections 16 are circumferentially distributed around the upper bearing cap 1 such that one reinforcement section 22 is arranged between two hook sections 16 and vice versa. Alternatively, more than one reinforcement section 22, for example two, may be arranged between two hook sections 16. It should also be noted that the reinforcement section 22 can be omitted as well. For example, if the required robustness of the upper bearing cap 1 can be achieved with the just hook sections 16, the reinforcement sections 22 can be omitted in order to further reduce the amount material needed for the upper bearing cap 1.

A circumferential extension of the hook sections 16 differs from the circumferential extension of the at least one reinforcement section 22. For example, the circumferential extension of the reinforcement section 22 may be smaller than the circumferential extension of the hook section 16, as shown in the FIGS. 1 and 3. Alternatively, the circumferential extension of the hook sections 16 and the reinforcement sections 22 may be equal, or the circumferential extension of the hook sections 16 may be smaller than the circumferential extension of the reinforcement sections 22.

In summary, by providing at least one hook section 16 and/or at least one reinforcement section 22 that each have at least one wall with a partially increased thickness the robustness of the upper bearing cap may be increased. Thus, it is possible to reduce the thickness of the remaining walls of the upper bearing cap without reducing the robustness of the upper bearing cap such that the amount of material needed for the upper bearing cap may be reduced which consequently may reduce the costs for the upper bearing cap.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved suspension thrust bearing devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. An upper bearing cap for a suspension thrust bearing device, comprising:
   a radial wall having an upper surface configured to face a retainer seat and an opposite lower surface configured to contact a rolling-element bearing and a radially outside portion and a radially inside portion,
   an axial outer annular skirt extending axially downwards from a radial outer edge of the radial outside portion and having an axial outer surface and an opposite axial inner surface, and
   at least one hook section comprising at least one hook configured to interact with a further component of the suspension thrust bearing device,
   wherein the at least one hook section comprises a first portion of the radial outside portion of the radial wall and a first portion of the axial outer annular skirt,
   wherein a second portion of the radial outside portion of the radial wall adjacent to the first portion of the radial outside portion of the radial wall has a first thickness and a second portion of the axial outer annular skirt adjacent to the first portion of the axial outer annular skirt has a second thickness, and
   wherein at least a portion of the at least one hook section has a third thickness greater than the first thickness and greater than the second thickness.

2. The upper bearing cap according to claim 1,
   wherein the first portion of the radial outside portion of the radial wall has the third thickness, and the first portion of the axial outer annular skirt has a fourth thickness greater than the second thickness.

3. The upper bearing cap according to claim 2,
   wherein the at least one hook section comprises a first hook section circumferentially spaced from a second hook section.

4. The upper bearing cap according to claim 3, including a reinforcement section located between the first hook section and the second hook section, the reinforcement section comprising a third portion of the radial outside portion of the radial wall and a third portion of the axial outer skirt, and
   wherein at least a portion of the at least one reinforcement section has a fifth thickness greater than the first thickness.

5. The upper bearing cap according to claim 4,
   wherein the third portion of the radially outer portion of the radially outer wall has the fifth thickness and the third portion of the axial outer skirt has a sixth thickness greater than the second thickness.

6. The upper bearing cap according to claim 5,
   wherein the third thickness is equal to the fourth thickness.

7. The upper bearing cap according to claim 5, wherein the third thickness is different than the fourth thickness.

8. The upper bearing cap according to claim 5, wherein the at least one reinforcement section comprises a first reinforcement section circumferentially spaced from a second reinforcement section.

9. The upper bearing cap according to claim 8, wherein the second hook section is located between the first reinforcement section and the second reinforcement section.

10. A suspension thrust bearing device, comprising:
a lower support cap,
an upper bearing cap according to claim 9, and
at least one bearing arranged between the lower support cap and the upper bearing cap.

11. A suspension thrust bearing device, comprising:
a lower support cap,
an upper bearing cap according to claim 1, and
at least one bearing arranged between the lower support cap and the upper bearing cap.

\* \* \* \* \*